(12) United States Patent
Gardner

(10) Patent No.: US 8,898,974 B1
(45) Date of Patent: Dec. 2, 2014

(54) ELECTRICAL PANEL STRUCTURES

(71) Applicant: Amazon Technologies, Inc., Reno, NV (US)

(72) Inventor: Brock Robert Gardner, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/682,608

(22) Filed: Nov. 20, 2012

(51) Int. Cl.
| | | |
|---|---|---|
| *H02G 3/22* | (2006.01) | |
| *E04C 1/39* | (2006.01) | |
| *E04B 1/61* | (2006.01) | |
| *E04B 1/94* | (2006.01) | |

(52) U.S. Cl.
CPC ... *E04C 1/39* (2013.01); *E04B 1/61* (2013.01); *H02G 3/22* (2013.01); *E04B 1/948* (2013.01)
USPC ........................................ 52/220.8; 174/68.1

(58) Field of Classification Search
USPC .............. 52/220.1, 220.2, 220.7, 220.8, 36.1, 52/238.1, 239, 241, 242; 439/332, 537, 439/716, 207–216; 174/68.1, 68.3, 480, 81, 174/72 R, 88 R, 95
See application file for complete search history.

(56) References Cited

U.S. PATENT DOCUMENTS

| | | | | |
|---|---|---|---|---|
| 4,272,643 | A * | 6/1981 | Carroll et al. | 174/483 |
| 4,817,348 | A * | 4/1989 | Wydra | 52/220.8 |
| 5,344,106 | A * | 9/1994 | Beele | 248/56 |
| 5,675,194 | A * | 10/1997 | Domigan | 307/147 |
| 6,253,509 | B1 * | 7/2001 | Hellwig et al. | 52/239 |
| 6,490,829 | B1 * | 12/2002 | Schreiner et al. | 52/36.1 |
| 2005/0257456 | A1 * | 11/2005 | Biffis et al. | 52/220.1 |
| 2006/0035499 | A1 * | 2/2006 | Johnson et al. | 439/215 |
| 2006/0101724 | A1 * | 5/2006 | Hoekstra et al. | 52/36.1 |
| 2009/0094911 | A1 * | 4/2009 | Whitaker | 52/220.2 |
| 2010/0043309 | A1 * | 2/2010 | Martin et al. | 52/79.5 |
| 2010/0180518 | A1 * | 7/2010 | Postlethwaite | 52/79.1 |
| 2010/0192490 | A1 * | 8/2010 | Chang | 52/220.1 |
| 2011/0138708 | A1 * | 6/2011 | Chazelle et al. | 52/173.1 |
| 2011/0307102 | A1 * | 12/2011 | Czamara et al. | 700/277 |

* cited by examiner

*Primary Examiner* — William Gilbert
*Assistant Examiner* — Kyle Walraed-Sullivan
(74) *Attorney, Agent, or Firm* — Kilpatrick Townsend & Stockton LLP

(57) ABSTRACT

Electrical panel structures for a modular building system, such as a modular data center. The electrical panel structures provide a standardized structure for attachment of high voltage power, low voltage power, and/or data lines between rooms or components of the modular building system. The panel structures can include multiple conduits that extend between rooms or other components of a modular building structure. The panel structures can include, for example, conduits having couplers for the attachment of high voltage cables and/or pass-throughs for the passage of low voltage lines and/or data lines.

8 Claims, 7 Drawing Sheets

ELECTRICAL PANEL STRUCTURES

BACKGROUND

Modular building structures provide a portable method of deploying building capacity. As an example, a modular data center system includes modules and components to offer scalable data center capacity. Modules, such as rooms, can be shipped to a site and can be added, integrated, or retrofitted into an existing data center footprint, or combined into a system of existing modules. In this manner, a data center can be expanded without significant architectural or building costs.

Often, modular data centers include rooms that can be easily added to or removed from the main data center structure. However, an issue with such modular data centers is that power and data cable options are often centralized, and homerun power and data cables are routed to new rooms of the modular data center. After a number of these homerun cables have been connected through a number of rooms, removal of a room in the modular data center becomes complex, and can require multiple electricians and a large amount of restructuring.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with embodiments herein, electrical panel structures are provided for a modular building system, such as a modular data center. The electrical panel structures provide a standardized structure for attachment of high voltage power, low voltage power, and/or data lines between rooms or components of the modular building system. The panel structures can include multiple conduits that extend between rooms or other components of a modular building structure. The panel structures can include, for example, conduits having couplers for the attachment of high voltage cables and/or pass-throughs for the passage of low voltage lines and/or data lines.

In embodiments, the electrical panel structures are fitted into a wall and/or floor of each room or component of the modular building system. The panel structures may be, for example, provided in an upper corner of each room. Cables can be routed between the panel structures for providing low voltage or high voltage power options for a new room. A subpanel can be routed from the panel structures to provide power for the room.

The modularity of the panel structures permits quick connections between existing power and a new room, for example using a standardized cable coupler.

If desired, a panel structure can be provided that extends between an outside of a modular building and an inside of the building. In emergency situations, power can be disconnected from internal panel structures and can be connected to this externally-facing panel structure. The external side of the panel structure can be connected to a generator. This feature provides quick connectivity to a backup power system.

Figure 1:
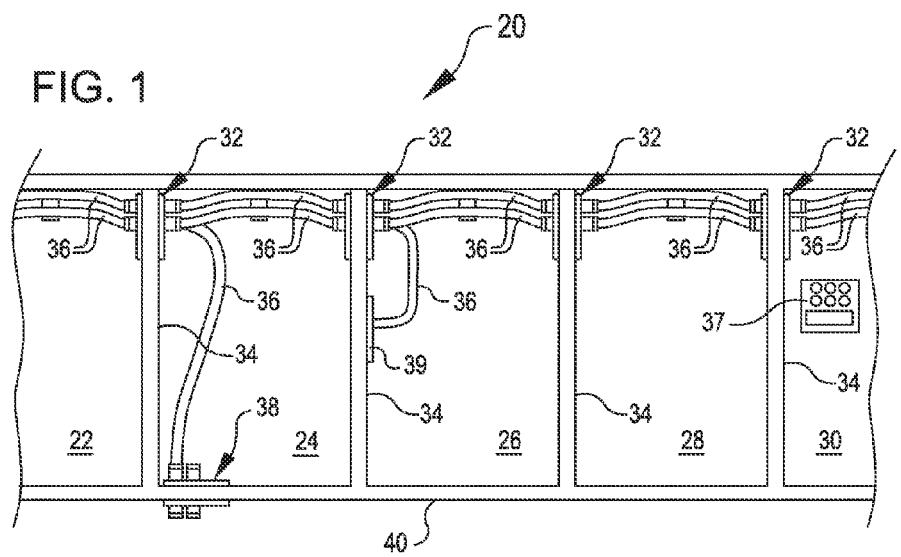
FIG. 1 shows a modular building system in accordance with embodiments.

Referring now to the drawings, in which like reference numerals represent like parts throughout the several views, FIG. 1 shows a modular building system 20 in accordance with embodiments. Modular building system 20 may be, for example, a modular data center, although features herein may be utilized in any type of modular building structure. For the embodiments described herein, however, the modular building system 20 is assumed to be a modular data center.

The modular building system 20 includes modular rooms 22, 24, 26, 28 and 30. The modular building system 20 may include any number of rooms, and, in the embodiment shown, includes five, but the number could be as little as one or as many as needed. In addition, although shown as side by side, the rooms 22, 24, 26, 28 and 30 can be arranged in other configurations, on one or more floors.

In accordance with embodiments, to aid in installation and removal of one or more of the rooms, such as the room 22, wall panel structures 32 are provided on walls 34 of each of the modular rooms. The wall panel structures 32 are configured for the attachment of, or routing through, of high and/or low voltage power or data lines. In the embodiment shown in the drawings, high voltage cables 36 are attached between the wall panel structures 32, but low voltage cables or data lines may be attached between the wall panel structures.

In embodiments, the modular building system 20 may be a structure having multiple floors. In such a case, one or more floor panel structures 38 may be provided between stacked floors. The cables 36 may extend between the wall panel structures 32 and the floor panel structure 38. In this manner, power or data can be routed between floors, utilizing the floor panel structure 38. Additionally, although not shown, an indoor/outdoor panel structure 37 may be provided on an exterior wall of one of the rooms, such as the room 30. As described below, the exterior panel structure can provide hookups for a generator, for example.

Figure 2:
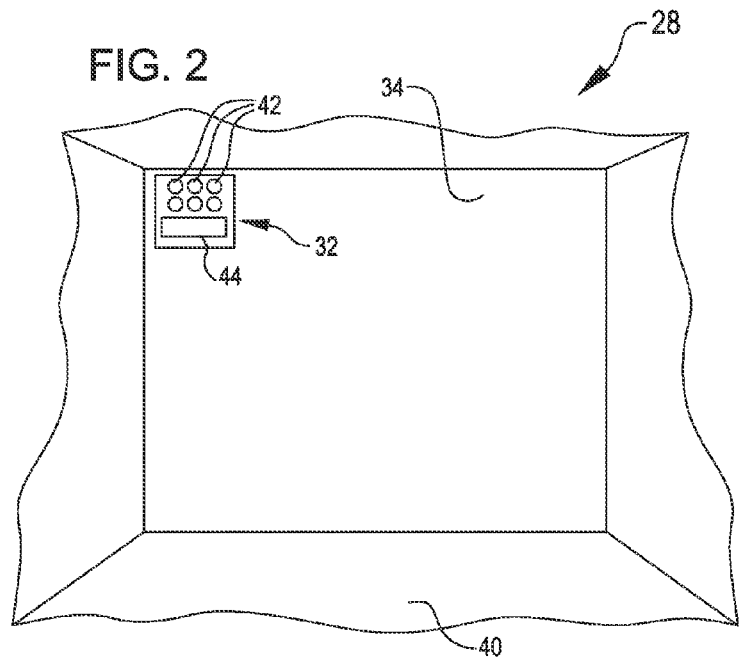
FIG. 2 is a diagrammatic representation of one of the walls for a room for the building system of FIG. 1.

FIG. 2 shows a diagrammatic representation of one of the walls 34 for the room 28. As can be seen, in the embodiment shown in the drawing, the wall panel structure 32 is mounted in an upper corner of the wall 34. In this manner, the cables 36 can be routed along an upper edge of the room 28, so that the cables are removed from furniture, servers or other server farm equipment in the room. The wall panel structure 32 shown in FIG. 2 includes six conduits 42 arranged at a top portion and a single pass-through 44 at a lower portion. Any number of conduits 42 and/or pass-throughs 44 may be provided on a wall panel structure 32 or floor panel structure 38.

The wall panel structures 32 and the floor panel structure 38 can be standardized (i.e., have common configurations), or a number of different arrangements can be provided for different installations.

In embodiments described herein, the conduits 42 are utilized for the connection of high voltage cable, such as via the cables 36. The pass-throughs 44 are utilized for routing of data wires, low voltage wires, and/or other wiring. In embodiments, the wall panel structures 32 and/or the floor panel structure 38 can be added to a modular room, such as the modular room 24 upon installation and/or as a retrofit to an existing room.

Figure 3:
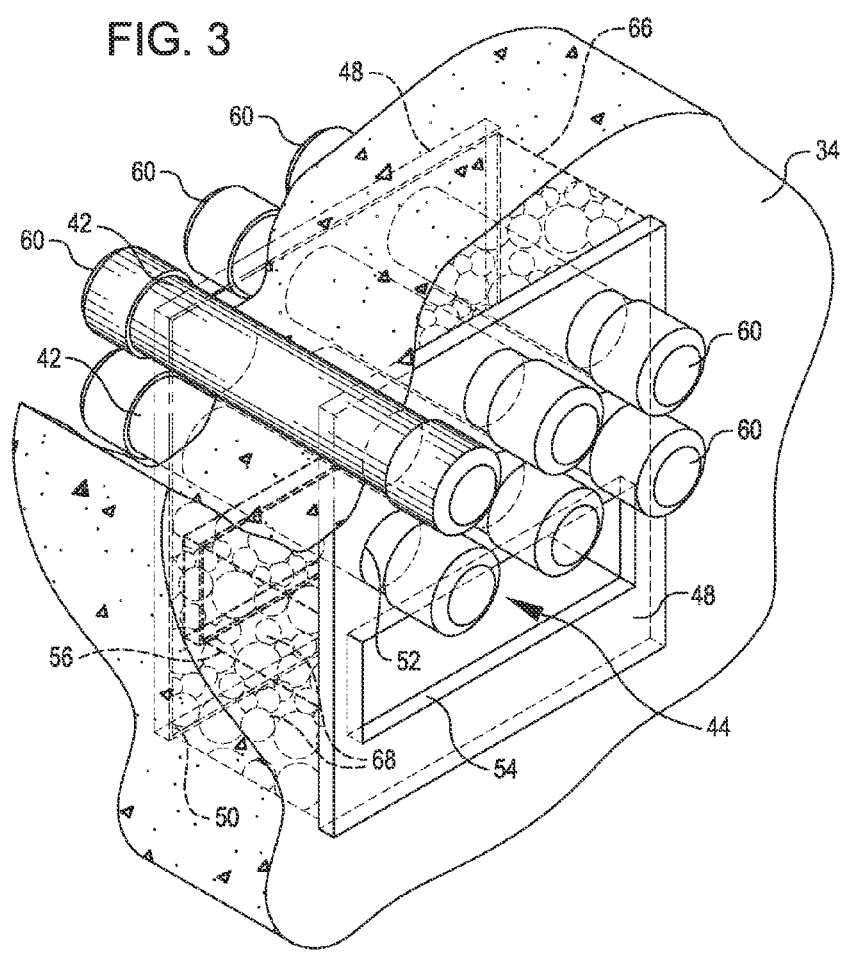
FIG. 3 is a side perspective view of an electrical panel structure in accordance with embodiments.

FIG. 3 shows an example of an embodiment of the wall panel structure 32 in which the wall panel structure is added during construction of a room. In the embodiment shown in FIG. 3, the wall panel structure 32 is mounted in the wall 34. To this end, an opening or hole 66 is cut or formed in the wall 34, and the wall panel structure 32 is mounted through the opening.

In the embodiments shown in FIG. 3, two panels 48 are mounted on opposite sides of the wall panel structure 32 at the hole 66. Each of these panels 48 includes a rim 50 that faces the wall 34. This rim 50 and the outer edges of the panel 48 overlap the outer edges of the hole 66. The panels 48 include openings 52 for receiving the conduits 42. Lower openings 54 provide an entrance and outlet for the pass-through 44. To define a structure for the pass-through 44, an open-ended box 56 is provided between the two openings 54. Although the pass-through 44 is shaped with a rectangular cross-section, the pass-through can take any shape of a conduit, including the shape of the conduits 42.

In the embodiment shown in FIG. 3, the conduits 42 are a continuous structure that extends between each of the panels 48 and out of the panels. Caps 60 may be provided when the conduits are not in use. These conduits may be, for example, four inch diameter pipes, such as polyvinyl chloride (PVC) pipes, or pipes or other conduits made of other nonconductive materials. Similarly, the box 56 can be formed of a suitable material, preferably nonconductive.

In embodiments, to prevent a situation where the wall panel structure 32 would be a hot spot in a fire, fire retardant filler 68, such as a fire blocking foam or putty, is installed in the hole 66 during installation. This fire retardant filler 68 fits around conduits 42 and the box 56 and fills the hole 66 up to the edges of the wall 34. In this manner, the fire retardant filler 68 provides fireproofing for the wall panel structure 32.

If desired, the conduits 42 can be prewired with wires therein, and with couplings on either end so as to provide quick attachment of the cables 36. Alternatively, the conduits 42 can be hollow, and the cable 36 can extend through a conduit 42 and can be attached at an opposite end, inside a second room for example, to another cable.

Figure 4:
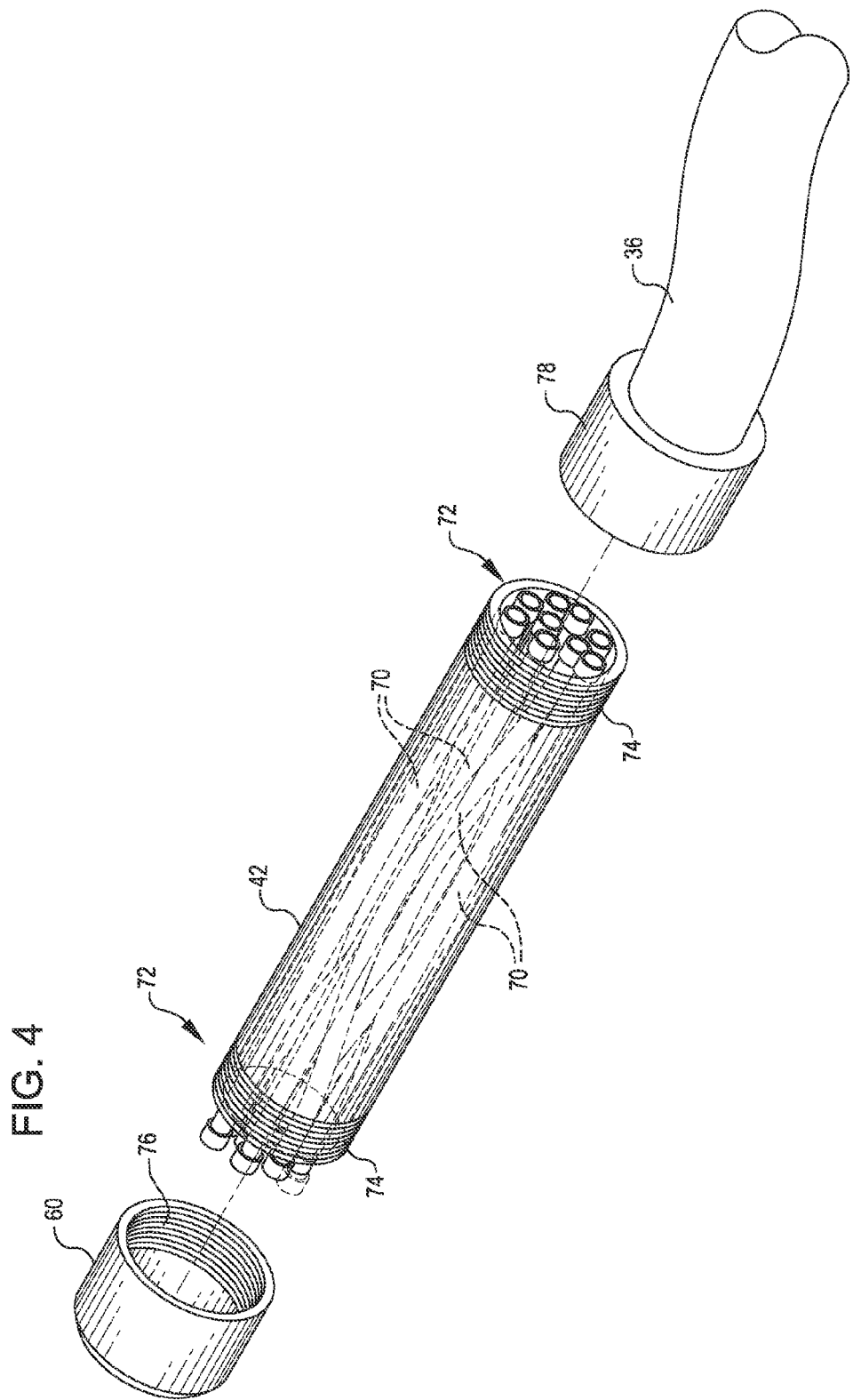
FIG. 4 is an exploded perspective view of a pre-wired conduit for the panel structure of FIG. 3 in accordance with embodiments.

FIG. 4 is a perspective view of an embodiment of the conduit 42 having wires 70 that extend along an inside of its length. The conduit 42 includes male threads 74 at outer ends. The cap 60 may include matching female threads 76 for fitting onto either of the male threads 74. The bundle of wires 70 at the end of the conduit 42 forms a coupler 72, which can be arranged in any standard pattern to provide quick connectivity with the cables 36. To this end, the cable 36 may include a coupler 78 on an end that threads onto the male threads 74 and includes a wiring structure (not shown) that mates with and attaches to the wires 70 for connectivity. In addition, while described as "wires", the wires can be a single power cable, one or more data cables, or any combination of these.

Figure 5:
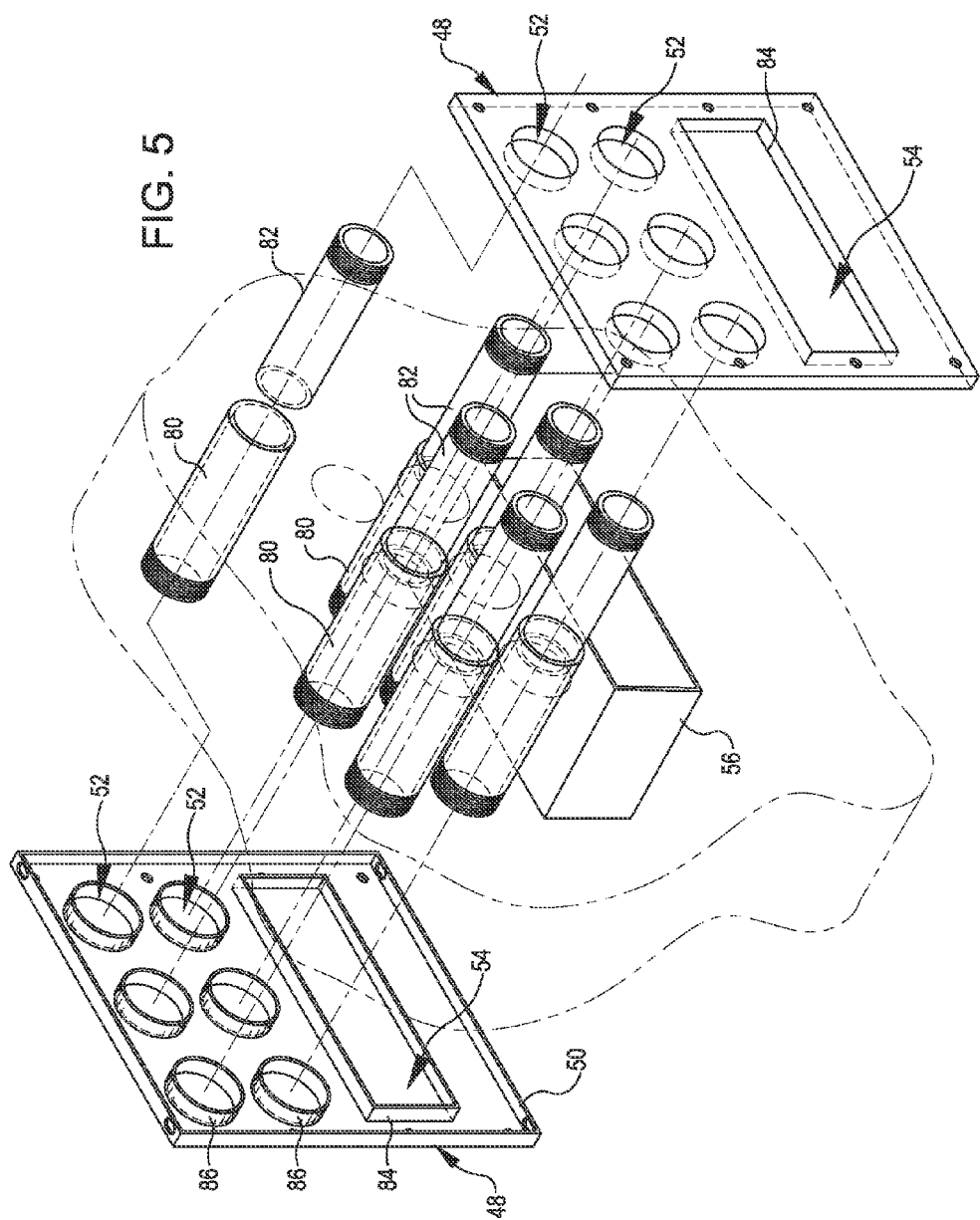
FIG. 5 is an exploded perspective of an electrical panel structure in accordance with embodiments.
Figure 6:
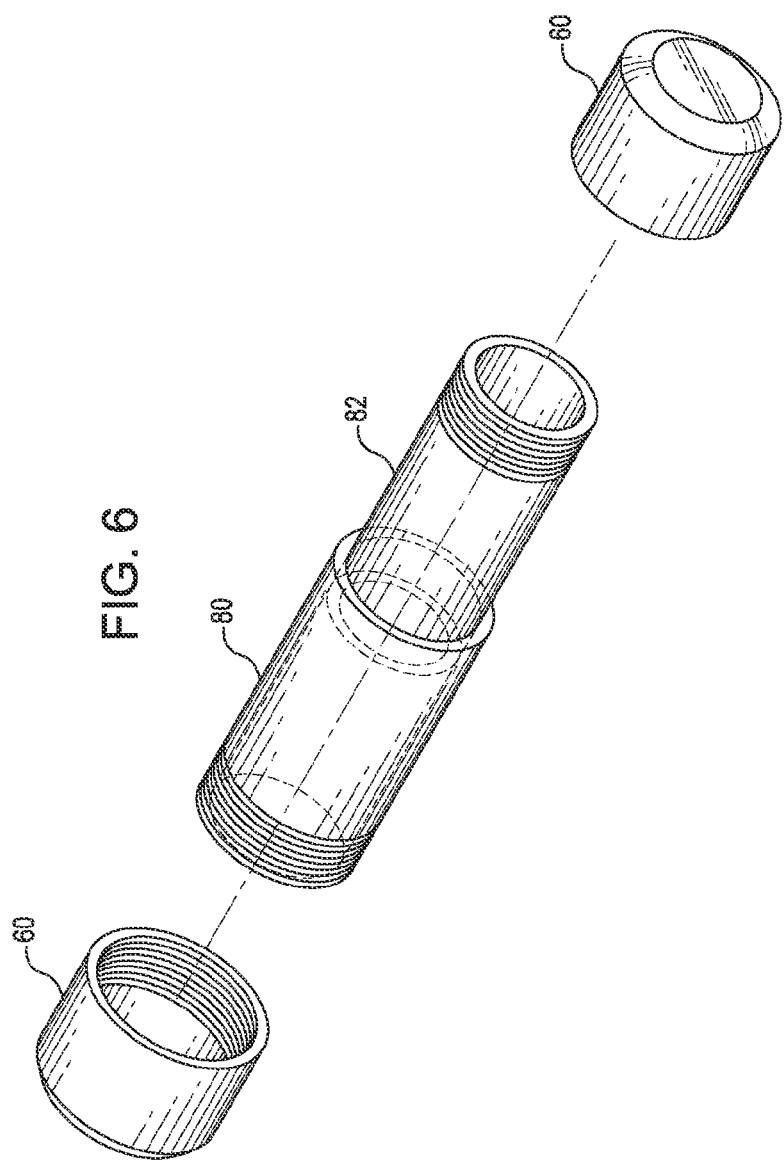
FIG. 6 is an exploded perspective view of a two piece conduit for the panel structure of FIG. 5 in accordance with embodiments.

FIG. 5 is an exploded perspective view of an alternate embodiment of the wall panel structure 32 utilizing two-piece conduits for a retrofit construction. In this embodiment, the two-piece conduits include two halves 80, 82 that fit together during installation, as shown in FIG. 6, so as to form a single conduit. Prior to installation, the first half 80 can be connected to a panel 48 on one side of the wall, and the second half 82 can be connected to a panel 48 on the opposite side of the wall. The two halves 80, 82 are pressed together when the wall panel structure 32 is assembled.

As shown in FIG. 5, the panels 48 can include rims 84, 86 for the pass-through 44 and the conduits 42, respectively. These rims 84, 86 provide a structure into which the box 56 and the conduits may be fitted. In addition, the rims 84, 86 and outer rim 50 of the panels 48 can be used to capture and maintain the fire retardant filler 68 upon installation of the wall panel structure 32. This feature permits the fire retardant filler 68 to completely fill the opening 66 and not flow out of the panel 48. Thus, an installer can put fire retardant filler material around the conduits 42 and the box 56 and press the panels toward each other, with the fire retardant filler being formed into the spaces between the conduits 42 and the pass-through 44.

The two halves 80, 82 are brought together during the installation process with a leading edge of the half 82 fitting into the half 80. In the embodiment shown in FIG. 6, the half 82 has a smaller diameter than the half 80 for this purpose. If desired, instead of having a reduced diameter, one of the halves may include a flange that fits around the outer rim of the other half.

Once the two halves 80, 82 are put together, if desired, wires such as the wires 70 can be installed in the two halves 80, 82 to provide a prewired structure. In addition, the caps 60 may be fitted on the ends of the two halves 80, 82 when the conduit is not in use.

The conduit having the two halves 80, 82 provides an advantage in that panels 48 may be installed from either side with attached conduit halves. Similarly, although not shown, the box 56 can be provided in two pieces. In addition, this structure provides a structure where the halves 80, 82 can be fixed to the panels 48 offsite. The shorter conduit halves 80, 82 also permit an installer to have access to the opening for installing fire retardant filler 68 on the inside of the each of the panels 48. The installer can then press the two panels into place against the hole 66, with the fire retardant filler 68 on the two panels sealing the area around the conduits and the box 56. As an alternate to this structure, as described above, the box 56 and the conduits 42 can be single structures, as shown in FIG. 3.

In accordance with embodiments, the panels 48, with the box 56 and the conduits 42 installed therein, may serve as a concrete form in the floor 40 or the wall 34. That is, the panels 48 may be put in place and concrete or another flowable building material may be poured and set around the box 56 and the conduits 42 during the construction project. In this embodiment, concrete is utilized, and forms the structure around the conduits 42 and the box 56. The panels 48 can be left after the concrete sets, or can be removed.

Figure 7:
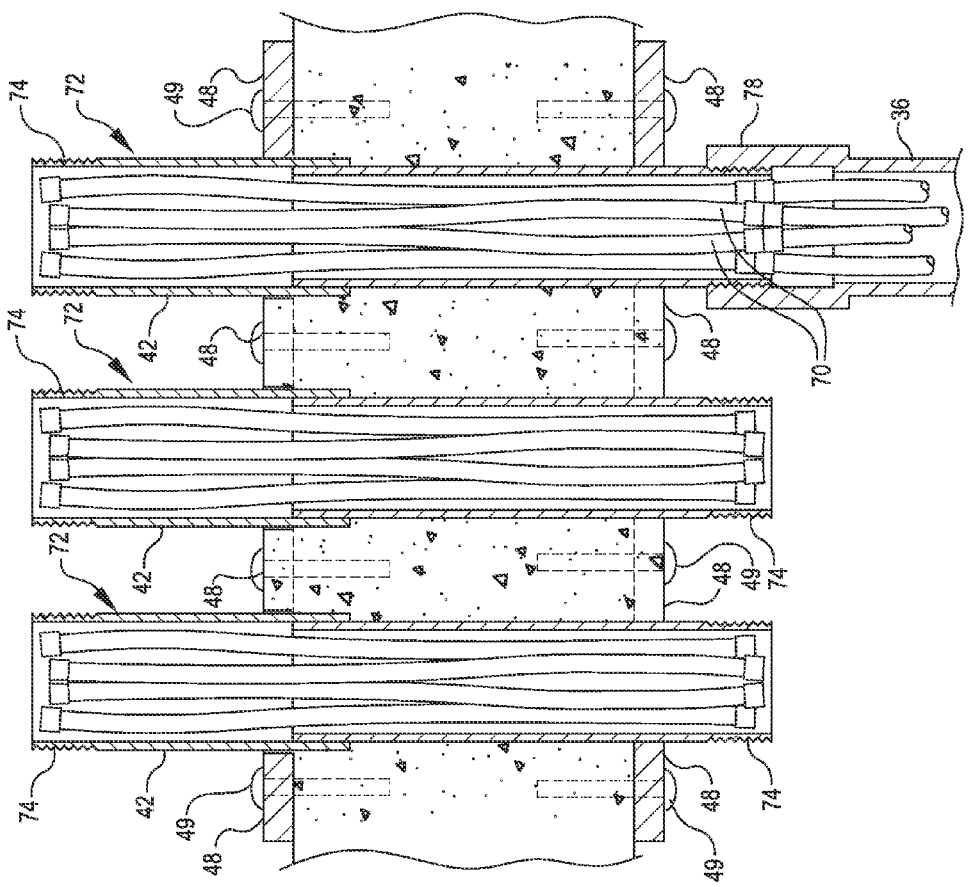
FIG. 7 is a cutaway view of a floor panel structure in accordance with embodiments.
Figure 8:
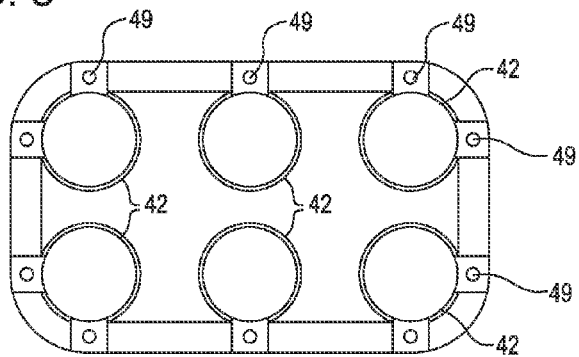
FIG. 8 is a top view of the floor panel structure of FIG. 7.

For example, as shown in FIGS. 7 and 8, top and bottom panels 48, in the form of rings, can be attached to the conduits 42 to hold the conduits into position. As shown in FIG. 8, the frame thus forms a structure for supporting the conduits 42. Concrete or another flowable building material can then be poured into the space between the two frames 48. Bolts 49 can be used to provide anchors for the concrete, once set.

Figure 9:
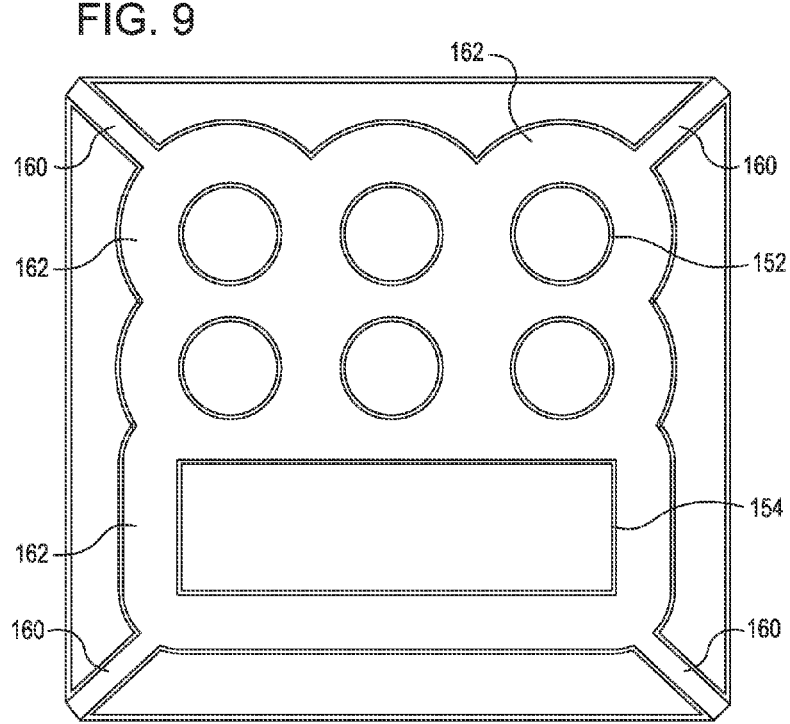
FIG. 9 is a diagrammatic representation of a frame for a panel structure in accordance with embodiments.

FIG. 9 shows an alternate embodiment of a panel 148 in which foam or another flowable fire retardant filler material is inserted after panels 148 have been installed against opposite sides of a wall. The panel 148 includes channels 160 that are connected to an internal space 162 defined between the outer panels 148. The channels 160 provide flow access to an inside of the panel 148 after the panel is installed against the wall. After the panels 148 are installed, an installer may spray fire retardant foam into the channels 160. The fire retardant foam flows into the space 162, fills the hole 66, and provides a fireproof structure for the wall panel structure.

The wall panel structures 32 and the floor panel structures 38 described herein provide quick connectibility and installation of low and high voltage wires in the modular building system 20. A new room that is installed in the modular building system 20, such as the room 22, can include the wall panel structures 32, and can quickly be added to the power infrastructure of the building by adding cables 36 between already-installed and wired wall panel structures 32. If it is desired to remove the room 22, the cables are disconnected, and the room can be dismantled.

In addition, the cables 36 and couplers 72, 78 provide quick connection or reroute of high voltage or low voltage power in the building, for example for restructuring the modular building structure 20, or in the case of emergency power outage. As an example, a cable 36 may be disconnected from one of the wall panel structures 32 downstream from a power supply and that cable can be reconnected to the indoor/outdoor wall panel structure 37. The indoor/outdoor wall panel structure 37 can be connected to a backup source of power, such as a generator.

Having the wall panel structures 32 and/or the floor panel structures 38 included in each of the rooms 22-30 permits the addition of more cabling and/or data lines without having to saw or otherwise form holes in walls of the rooms 22-30. A standard power configuration may use only two of the conduits 42, but the others may be readily available for additional cables 36. This feature is an important one because it permits modification to data center rooms or other structural rooms in a modular building system 20 without having to drill or saw more openings for the cables. This features thus avoids the associated dust or construction of adding more power or data lines.

Typically, data lines will be routed through the pass through 44. In this manner, a longer cable can be used, and multiple couplers are not needed.

Power for a single room can be routed from the wall panel structure 32 or the floor panel structure 38. As an example, FIG. 1 shows an embodiment where a subpanel 39 is connected to a wall panel structure 32 via a cable 36. The subpanel 39 provides power to the room 26.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A modular building system, comprising:
    a plurality of rooms separated by walls;
    a plurality of electrical panel structures, each electrical panel structure being mounted in a wall or floor and between an adjacent pair of rooms in the plurality of rooms, the electrical panel structure comprising at least two conduits for the connection or passage of at least one of power or data cabling between the pair of rooms; and
    at least one cable connecting two of the plurality of electrical panel structures, wherein said at least one cable and the conduits include standardized couplers for connecting said at least one cable to the conduits, wherein said conduits include internal wiring, and said at least one cable includes wires that electrically connect to the internal wiring when said at least one cable is connected to the conduits.

2. The modular building system of claim 1, wherein at least one of the electrical panel structures comprises a floor electrical panel structure, the floor electrical panel structure being mounted in a floor between a stacked pair of rooms in the plurality of rooms, the floor electrical panel structure comprising at least two conduits for the passage of at least one of power or data cabling between the stacked pair of rooms.

3. A method of building a data center, comprising:
    forming a plurality of rooms for the data center;

forming a plurality of openings, each of the openings extending through at least one of a wall or a floor and between a pair of adjacent rooms of the plurality of rooms;

installing a panel structure in each of the openings, the panel structure comprising at least one power conduit for the connection of power between the pair of rooms and at least one pass through conduit for the passage of data cabling between the pair of rooms; and connecting power conduits of two of the standardized panel structures by at least one cable, wherein said at least one cable and the power conduits include standardized couplers for connecting the power conduits by said at least one cable, wherein said power conduits include internal wiring, and said at least one cable includes wires that electrically connect to the internal wiring when said at least one cable is connected to the power conduits.

4. The method of claim 3, further comprising, for a first and second room of the plurality of rooms, connecting a first power cable to one of said at least one power conduit in the first room and a second power cable in the second room to said one power conduit to form an electrical connection between the first and second power cables.

5. The method of claim 4, further comprising installing an indoor/outdoor panel structure in an exterior wall of the second room, the indoor/outdoor panel structure comprising at least one power conduit for the connection of power cabling to the second power cable on one side, and for connection to a generator on another side.

6. The method of claim 5, wherein the first and second power cables and said one conduit include standardized couplers for connecting said at least one cable to said one conduit.

7. The method of claim 3, wherein the panel structures are standardized.

8. The method of claim 3, further comprising, for each electrical panel structure, installing a fire retardant filler in the opening when installing the electrical panel structure.

* * * * *